(«12») United States Patent
Kim

(10) Patent No.: US 6,486,965 B1
(45) Date of Patent: Nov. 26, 2002

(54) APPARATUS FOR MEASURING DEPTH AND GRADIENT OF TRENCH IN SEMICONDUCTOR DEVICE AND METHOD THEREOF

(75) Inventor: Hyung-Sik Kim, Cheongju (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/566,814

(22) Filed: May 8, 2000

(30) Foreign Application Priority Data

May 25, 1999 (KR) .............................................. 99-18827

(51) Int. Cl.[7] .............................................. G01B 11/00
(52) U.S. Cl. .................................... 356/626; 356/241.1
(58) Field of Search ................................ 356/626, 241.1

(56) References Cited

U.S. PATENT DOCUMENTS

| | | | | |
|---|---|---|---|---|
| 3,808,878 A | * | 5/1974 | Dini ............................. | 73/620 |
| 5,023,188 A | | 6/1991 | Tanaka ........................... | 437/8 |
| 5,087,121 A | * | 2/1992 | Kakuchi et al. ............. | 356/626 |
| 5,384,639 A | * | 1/1995 | Wickramasinge ........... | 356/496 |
| 5,528,359 A | * | 6/1996 | Taguchi ....................... | 356/626 |
| 5,691,540 A | | 11/1997 | Halle et al. .................. | 250/372 |

\* cited by examiner

Primary Examiner—Richard A. Rosenberger
(74) Attorney, Agent, or Firm—Fleshner & Kim, LLP

(57) ABSTRACT

An apparatus for measuring a depth and a gradient of a trench in a semiconductor device including: a light emitting element for making a light incident on a wafer while varying an incident angle, the wafer having a trench structure carried by a test sample carrying unit; a detect unit for detecting a light reflected from the wafer at a position symmetrical to the light emitting element on the basis of a virtual vertical line perpendicular to the wafer; a photoelectric conversion unit for converting an intensity of a light detected by the detect unit to an electric signal; an operating unit for receiving an output signal from the photoelectric conversion unit, catching a time point where the size of the received signal is increased or maintained, computing a depth of the trench by using a critical angle, that is, an incident angle where the incident light is reflected from the central portion of a lower surface of the trench, and judging the time point when the increasing output signal of the photoelectric conversion unit is maintained when the incident angle is below a critical angle as a sloping angle of the trench; and a display unit for displaying an operating result of the operating unit. By having such a construction, the gradient of the trench as well as the depth can be easily obtained by using the wafer where the semiconductor device is to be formed, without additionally making a test sample for measurement, so that a production cost can be much reduced and a reliability of the semiconductor device is much improved.

31 Claims, 5 Drawing Sheets

APPARATUS FOR MEASURING DEPTH AND GRADIENT OF TRENCH IN SEMICONDUCTOR DEVICE AND METHOD THEREOF

BACKGROUND OF THE INVENTION

1. Field of the Invention

The present invention relates to an apparatus for measuring a depth and a gradient of a trench in a semiconductor device, and more particularly, to an apparatus for measuring a depth and a gradient of a trench in a semiconductor device which is capable of accurately measuring a depth and a gradient of a trench actually on a wafer without damaging it, and to its method.

2. Description of the Background Art

Generally, as an isolating method of a highly integrated semiconductor device, a structure is taken that a trench is formed, in which an oxide film is filled. Therefore, forming the trench and measuring its depth and gradient is a requisite step to obtain a reliability for the process of the semiconductor device.

An apparatus for measuring characteristics of a semiconductor pattern uses an optical path difference between a light reflected from the surface of a test sample and a light having passed a medium. This is effective in measuring a thickness of a stacked film, which, however, is not suitably applied in case that the substrate is partially etched to form a step in an arbitrary depth, such as the trench.

For this reason, in order to measure the depth of the trench, the wafer is cut to observe its section, a method using a measuring instrument of α-step is employed, or a method using an equipment 'AFM' for measuring a roughness of a surface is employed.

An apparatus and a method for measuring a depth and a gradient of a trench in a semiconductor device in accordance with a conventional art will now be described with reference to the accompanying drawings.

FIG. 1 is a flow chart of a process of a method for measuring a depth and a gradient of a trench in a semiconductor device in accordance with a conventional art, which employs the method that the wafer test sample where a trench is formed is cut and its section is observed, including the steps of: preparing a section-observing test sample wafer for observing a section besides an actual wafer for forming a semiconductor device; forming a trench on the section-observing test sample wafer by a photolithographic process; and cutting the section-observing test sample wafer in a manner that the position where the trench is formed is shown in the cross section, and observing a depth and a gradient of the trench.

In this respect, as to the depth-measuring test sample wafer, the trench is to be formed the same as the actual product, and after it is cut, its section is observed by using an electron microscope SEM.

However, such an testing method is a kind of destructive test that needs to cut the wafer, which is not able to measure a depth and the gradient of the trench formed on the actual wafer where the semiconductor device is formed, degrading a reliability and causing an increase of expense due to the additional fabrication of he test sample wafer.

FIG. 2 is a schematic view of a method for measuring a depth of a trench by using an α-step equipment.

As shown in this drawing, a probe needle 1 is moved on a wafer 2 where a trench is formed, so as to measure a depth of the trench by a piezoelectric transducer by using a pressure difference between the upper portion of the wafer 2 where the trench is not formed and the lower portion of the trench.

In case of using the probe needle 1, since a pressure is high at the upper surface of the wafer 2 where a trench is not formed, while it is relatively low at the lower surface of the trench where the step is low, the depth of the trench can be calculated by using the pressure difference. But, since the wafer is damaged while the probe needle is being moved, this method can not be adopted to the actual wafer to fabricate a semiconductor device, and thus, a specific test sample needs to be separately made like in the above method for observing the section.

FIG. 3 is a schematic view showing a method for measuring a depth of a trench by using an AFM equipment in accordance with a conventional art.

As shown in this drawing, the AFM equipment measures a roughness of the wafer 2 by using the probe needle 1 at a position separated by 100 Å at maximum from the upper surface of the wafer.

Unlike the above described two conventional embodiments, this measuring method uses a Van der Waals' force that works on the mutually separated probe needle 1 and the water 2 so as to numerically express a variation in the force working on a separated distance, thereby measuring the roughness of a specific thin film. This is a non-destructive testing which advantageously does not do a direct damage to the wafer.

However, the ATM equipment is applied to measure a roughness with deviation of tens of nm, which is not suitable to measure a depth of a trench formed in deviation of hundreds of nm in the process for fabricating semiconductor device.

Noticing from a graph of FIG. 4 showing a variation of Van der Waals' force depending on a distance, as the distance between the probe needle 1 and the wafer 2 becomes close, a repulsive force works on therebetween, while the distance between the two becomes more distant, an attractive force works on therebetween. In this respect, in case of more than a predetermined distance, the attractive force is maintained at the same value in spite of the variation in the distance. Then, measurement of a depth would be impossible for a structure having a depth longer than a predetermined depth.

In addition, except the method for observing the section by cutting the wafer, other methods are not suitably applied to characteristic test for a trench in terms of accuracy because the gradient of the trench can be hardly measured.

Thus, currently in order to test the characteristics of the trench formed on the wafer, a method is yet largely taken in that a trench is formed on the test sample, which is then cut to observe a section thereof.

Accordingly, as to the apparatus and method for measuring the depth and the gradient of the trench in the semiconductor device, since the depth and the gradient of the trench formed on the actual wafer for forming the semiconductor device can not be measured, a test sample is to be additionally fabricated, causing an increase in expense and degrading a reliability.

Especially, methods for attempting to measure the gradient of the trench is very limited, causing a problem in that characteristics of the trench can not be accurately measured, resulting in degradation of the semiconductor device.

SUMMARY OF THE INVENTION

Therefore, an object of the present invention is to provide an apparatus for measuring a depth and a gradient of a trench in a semiconductor device which is capable of accurately measuring a depth and a gradient of a trench on an actual wafer without damaging it, and to its method.

To achieve these and other advantages and in accordance with the purposed of the present invention, as embodied and broadly described herein, there is provided an apparatus for measuring a depth and a gradient of a trench in a semiconductor device including: a light emitting element for making a light incident on a wafer while varying an incident angle, the wafer having a trench structure carried by a test sample carrying unit; a detect unit for detecting a light reflected from the wafer at a position symmetrical to the light emitting element on the basis of a virtual vertical line perpendicular to the wafer; a photoelectric conversion unit for converting an intensity of a light detected by the detect unit to an electric signal; an operating unit for receiving an output signal from the photoelectric conversion unit, catching a time point where the size of the received signal is increased or maintained, computing a depth of the trench by using a critical angle, that is, an incident angle where the incident light is reflected from the central portion of a lower surface of the trench, and judging the time point when the increasing output signal of the photoelectric conversion unit is maintained when the incident angle is below a critical angle as a sloping angle of the trench; and a display unit for displaying an operating result of the operating unit.

In order to obtain the above object, there is also provide a method for measuring a depth and a gradient of a trench in a semiconductor device including: a test-sample preparing step for preparing a test sample trench on a wafer, where a semiconductor device is to be formed; critical angle and sloping angle detecting step for making a light, of which incident angle is sequentially varied, incident on the wafer where the trench was formed, detecting a light reflected from the wafer, and detecting both a critical angle in which the incident light is first reflected from the bottom of the trench and an incident angle at the time point when the intensity of the incident light is maximized; and a trench depth computing step for computing a depth of the trench by using the critical angle and the width of the trench.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
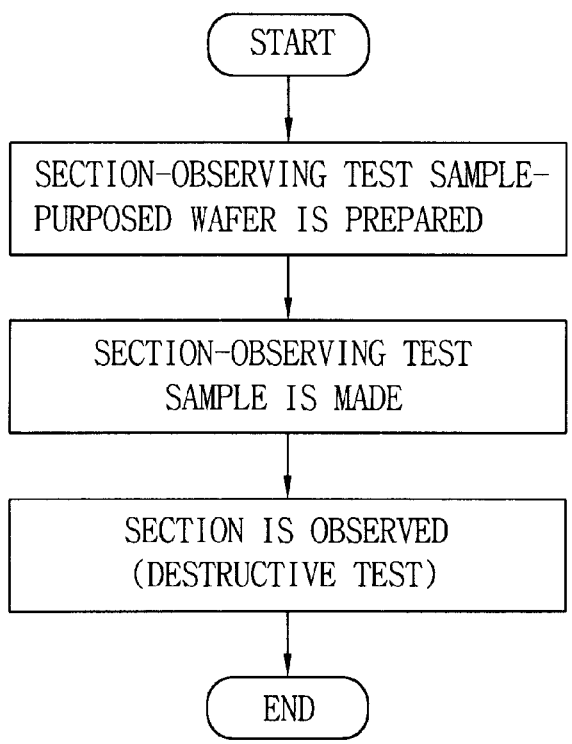
FIG. 1 is a flow chart of a process of a method for measuring a depth and a gradient of a trench in a semiconductor device in accordance with a conventional art.
Figure 2:
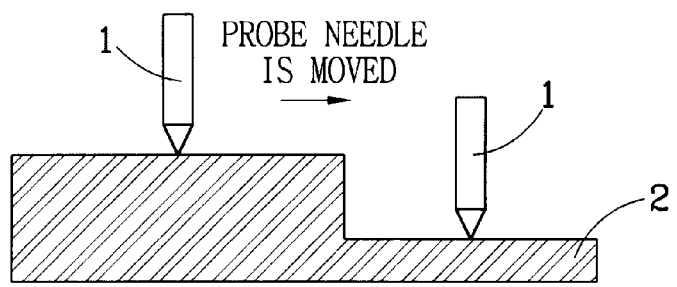
FIG. 2 is a schematic view showing a process of a method for measuring a depth and a gradient of a trench in a semiconductor device in accordance with an example of the conventional art.
Figure 3:
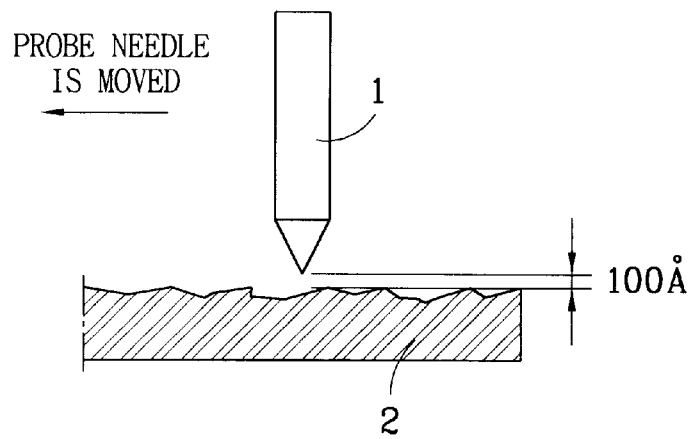
FIG. 3 is a schematic view showing a process of a method for measuring a depth and a gradient of a trench in a semiconductor device in accordance with another example of the conventional art.
Figure 4:
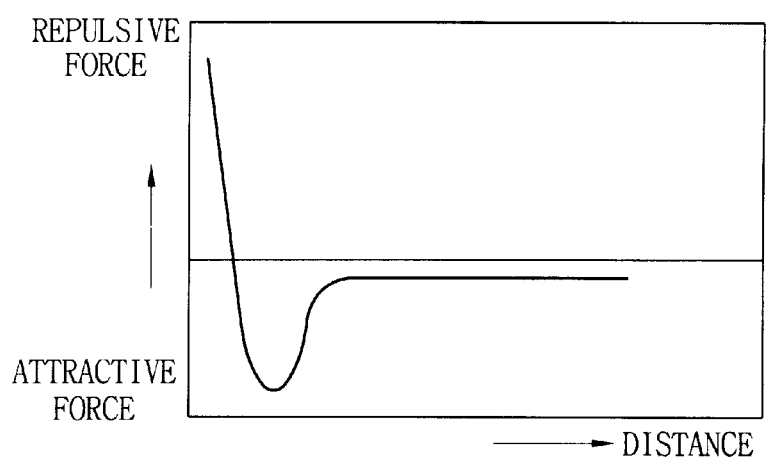
FIG. 4 is a graph showing a variation of Van der Waals' force depending on distances of FIG. 3 in accordance with the conventional art.
Figure 5:
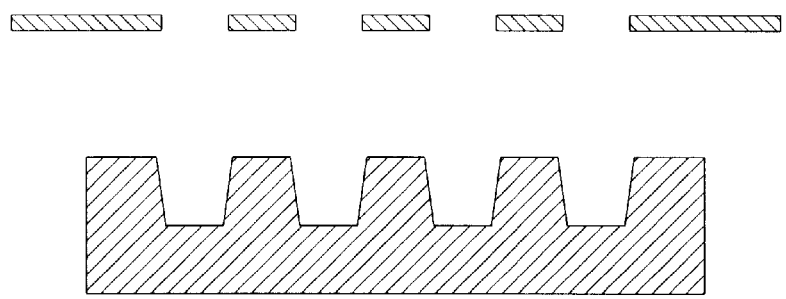
FIG. 5 is a sectional view of a test pattern for measuring a depth and a gradient of a trench in a semiconductor device in accordance with the present invention.

FIG. 5 is a sectional view of a test pattern for measuring a depth and a gradient of a trench in a semiconductor device in accordance with the present invention.

As shown in the drawing, a plurality of test-purposed trenches each having the same line width as an actual trench are formed on an actual wafer 2 where a semiconductor device is to be formed. The measurement would be easy as the test-purposed trenches are increased in number on the same area because of the fact that as the intensity of the reflected light becomes stronger, the density is higher.

After the test trenches are formed on the actual wafer for forming a semiconductor device, a light is radiated thereon. And, an intensity of the reflected light of the light is measured, according to which a depth of the trench can be measured based on the variation of intensity of the reflected light, details of which will now be described.

Figure 6A:
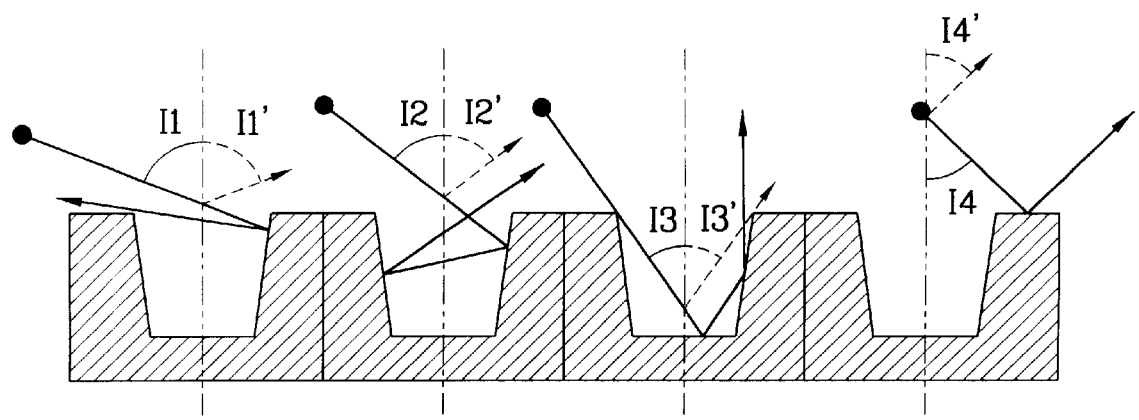
FIGS. 6A to 6C are schematic views showing types of reflection of a light made incident on a trench according to incident angles in accordance with the present invention.
Figure 6B:
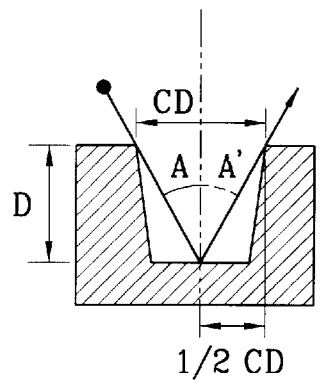
Figure 6C:
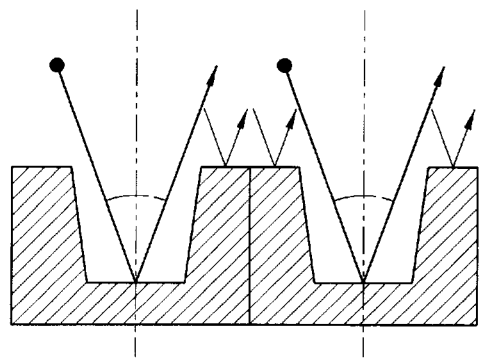

FIGS. 6A to 6C are schematic views showing types of reflection of a light made incident on a trench according to incident angles in accordance with the present invention.

As shown in FIG. 6A, in case that a light is made incident at the incident angles of 11, 12, 13 and 14 greater than a critical angle on the basis of a virtual vertical line passing the wafer, since a detector (not shown) is positioned separated as much as arbitrary angles 11', 12', 13' and 14', that is, the same angle as the incident lights 11, 12, 13 and 14 over the virtual vertical line, no reflected light can be detected.

As shown in FIG. 6B, in case that the incident light is reflected from the center of the bottom of the trench corresponding to the center of the width CD of the trench, a reflected light can be detected at the position of angle 'A" which is symmetrical centering the virtual vertical line, of which the incident angle is defined as a critical angle 'A'.

As shown in FIG. 6C, in case that an incident angle is smaller than the critical angle, the incident light can be detected at a position of the same angle as the incident light, like in the case that the incident angle is the same as the critical angle 'A', of which the intensity of the detected light is stronger than the light made incident at the critical angle 'A'.

The critical angle 'A' is set depending on a variation of intensity of a light detected by a detector as follows: A light is made evenly incident on the wafer, and incident angle of the light is varied in a direction perpendicular to the water, by which the intensity of the light detected by the detector which is installed at a position symmetrical to the position of the light made incident on the basis of the virtual vertical line perpendicular to the wafer is varied.

Namely, in case that a light is made incident in a direction horizontal (90° angle to the virtual vertical line) to the initial wafer, there is no light reflected from the wafer. And, if the incident light has an angle greater than a specific critical angle 'A', a value of the reflected light detected from the sloping side of the trench is maintained at a constant level and the intensity of the reflected light as detected while passing the critical angle 'A' becomes stronger.

In addition, in case that the incident angle is gradually decreased below the critical angle 'A', the reflection area is no more increased, so that the reflected light is maintained at a constant level.

Another characteristics of the critical angle 'A' as thusly set is that the light made incident at the critical angle 'A' is reflected from the central portion of the trench, according to which a depth of the trench can be calculated by the below equation with reference to a mask pattern that denotes the size of the trench.

$$D = \frac{CD}{2 \times \tan A} \quad \text{equation (1)}$$

In the above equation (1), 'D' indicates a depth of the trench, 'CD' indicates a line width of the trench at the initial time of designing, and 'A' indicates the critical angle. This equation is easily understood, having the same formula for obtaining a height of the isosceles triangle.

Figure 7:
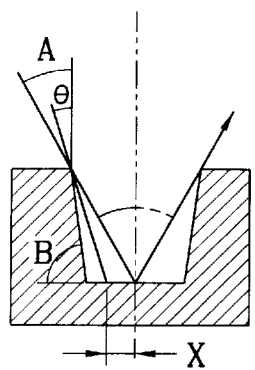
FIG. 7 is a schematic view showing an increase of a reflection area according to an incident light below a critical angle in accordance with the present invention.

And, as described above, since the reflection area is increased for the incident angle below the critical angle 'A', the intensity of the reflected light as detected becomes strong. As shown in FIG. 7, in case that the incident angle of the light is decreased to an angle below the critical angle 'A', the incident light is gradually reflected from the whole bottom of the trench, and accordingly, the intensity of the reflected light becomes stronger due to the increase in the reflection area.

The increase of the reflection area depending on the incident angle can be expressed by the following equation:

$$X = \frac{CD}{2} - (D \times \tan\theta) \quad \text{equation (2)}$$

The above equation (2) is applied to only in case that the gap angle between the critical angle 'A' and the virtual vertical line perpendicular to the wafer is greater than the difference between 90° and the angle 'B' of the sloping side of the trench and smaller than the critical angle 'A'. In the equation, 'X' indicates a reflection area, 'CD' indicates a width of the upper portion of the trench, and 'D' indicates a depth of the trench.

That is, it is natural that the deeper the depth of the trench is, the smaller the area of the lower flat side of the trench while having the same 'CD' is, and while the reflection area 'X' is being increased as the incident angle of the light is decreased, when the incident angle goes beyond the sloping angle 'B', that is, the gradient of the side of the trench, since there is no more increase in the reflection area 'X', the intensity of the reflected light as detected is again constantly maintained. In this respect, the incident angle at the point when the intensity of the reflected light is again constant becomes the sloping angle 'B' of the sloping side of the trench.

Figure 8:
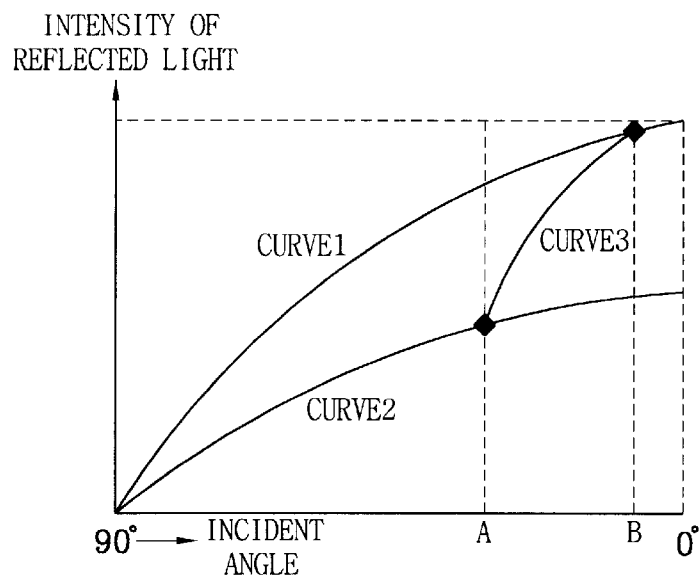
FIG. 8 is a graph showing an intensity of a light as detected according to a variation of the incident angle in accordance with the present invention.

FIG. 8 is a graph showing the intensity of the reflected light detected according to a variation of the incident angle in accordance with the present invention.

In the drawing, CRUVE1 shows a relationship between the incident angle and the intensity of the reflected light over the light made incident on the total area of the upper flat side and the lower flat side of the trench for measurement, CURVE2 shows a relationship between the incident angle and the intensity of the reflected light over the light made incident on the upper flat side of the trench for measurement, and CURVE3 shows a relationship between the intensity of the reflected light and the incident angle of the trench for measurement.

The time point when the intensity of the reflected light starts increasing is the critical angle 'A', and by detecting the critical angle 'A', the depth of the trench can be easily computed. And, the incident angle at the time when the intensity of the reflected light is constant after being increased becomes the sloping angle 'B' of the sloping side of the trench, by which the depth and the gradient of the trench can be easily obtained.

Figure 9:
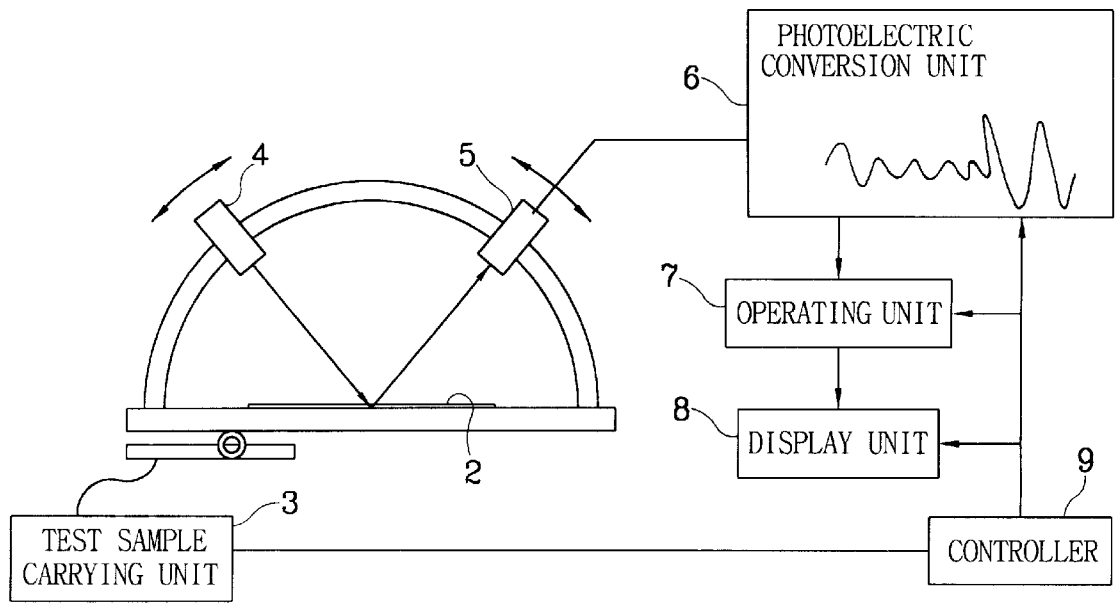
FIG. 9 is a schematic view of an apparatus for measuring a depth and a gradient of a trench in a semiconductor device in accordance with the present invention.

FIG. 9 is a schematic view of an apparatus for measuring a depth and a gradient of a trench in a semiconductor device in accordance with the present invention, which includes a light emitting element for making a light incident on a wafer while varying an incident angle, the wafer having a trench structure carried by a test sample carrying unit; a detect unit for detecting a light reflected from the wafer at a position symmetrical to the light emitting element on the basis of a virtual vertical line perpendicular to the wafer; a photoelectric conversion unit for converting an intensity of a light detected by the detect unit to an electric signal; an operating unit for receiving an output signal from the photoelectric conversion unit, catching a time point where the size of the received signal is increased or maintained, computing a depth of the trench by using a critical angle, that is, an incident angle where the incident light is reflected from the central portion of a lower surface of the trench, and judging the time point when the increasing output signal of the photoelectric conversion unit is maintained when the incident angle is below a critical angle as a sloping angle of the trench; and a display unit for displaying an operating result of the operating unit.

As to the apparatus, in order to detect the above-described critical angle 'A' and the sloping angle 'B' of the sloping side of the trench, the light emitting unit 4 and the detect unit 5 are moved from the position parallel to the wafer 2 to the position vertical to the wafer 2, and the critical angle 'A' and the sloping angle 'B' are obtained by using the intensity of the reflected light detected by the detect unit 5.

Meanwhile, the operating unit 7 computes the depth of the trench by using the equation (1), and the display unit 8 displays the operation result performed by the operating unit 7 so as for a user to recognize it easily, according to which the depth and the gradient of the trench can be measured without damaging the actual wafer where the semiconductor device is to be formed.

As so far described, according to the apparatus and method for measuring the depth and the gradient of the trench in the semiconductor device of the present invention, a light is applied on the wafer, where the trench is formed, by sequentially varying the incident angle, and a variation in the intensity of the reflected light detected by the detect unit, which is symmetrically positioned with the incident light on the basis of a virtual vertical line perpendicular to the wafer, is detected, based on which the critical angle, that is, the incident angle of the light reflected from the center of the bottom of the trench is obtained to thereby compute the depth of the trench. And, the sloping angle of the trench is obtained by using the incident angle at the time when the reflection area of the light is no more increased.

Accordingly, the gradient of the trench as well as the depth can be easily obtained by using the wafer where the semiconductor device is to be formed, without additionally making a test sample for measurement, so that a production cost can be much reduced and a reliability of the semiconductor device is much improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus to measure a parameter of at least one trench, comprising:
   a light source configured to project light into the at least one trench at a plurality of angles of incidence; and
   a light detector configured to measure the intensity of light reflected out of the at least one trench at each respective angle of incidence.

2. The apparatus of claim 1, where the light source comprises a light emitting element.

3. The apparatus of claim 1, wherein the light detector is configured to measure substantially only the light reflected at an angle substantially equal to the angle of incidence.

4. The apparatus of claim 3, wherein the light detector is configured to measure the light reflected out of the at least one trench.

5. The apparatus of claim 3, wherein the at least one trench comprises a bottom surface and the light detector measures light comprising light reflected off the bottom surface of the at least one trench.

6. The apparatus of claim 3, wherein the at least one trench comprises a sidewall and the light detector measures light comprising light reflected off the sidewall of the at least one trench.

7. The apparatus of claim 3, wherein the at least one trench is disposed in a substantially planar surface and the light detector measures light comprising light reflected off the substantially planar surface.

8. The apparatus of claim 1, wherein the light source is configured to controllably vary the angle of incidence between about 90° and about 0°.

9. The apparatus of claim 1, wherein the light comprises non-coherent light.

10. The apparatus of claim 1, wherein the light comprises coherent light.

11. The apparatus of claim 1, wherein the light comprises multiple frequencies.

12. The apparatus of claim 1 wherein the light detector comprises a photo-detector.

13. The apparatus of claim 1, wherein the light detector comprises a photo-electric conversion unit configured to produce an electric signal in accordance with the intensity of light measured by the light detector.

14. The apparatus of claim 1, wherein the parameter comprises a depth of the at least one trench.

15. The apparatus of claim 1, wherein the parameter comprises a slope of a wall of the at least one trench.

16. The apparatus of claim 1, further comprising an operating unit coupled to the light detector.

17. The apparatus of claim 16, further comprising a controller coupled to the operating unit and configured to control the angle of incidence of the light source in accordance with a signal received from the controller.

18. The apparatus of claim 16, wherein the operating unit comprises a processor configured to compare the intensity of light reflected out of the at least one trench at each respective angle of incidence.

19. The apparatus of claim 18, wherein the processor is further configured to determine a depth of the at least one trench by measuring a critical angle A, wherein the critical angle A is the angle of incidence at which the intensity of the reflected light measured by the light detector begins to become stronger as the angle of incidence decreases.

20. The apparatus of claim 19, wherein the processor is further configured to determine the depth of the at least one trench based upon the relationship $D=CD/2 \tan A$, where D is the depth of the at least one trench, CD is a width of the at least one trench, and A is the critical angle.

21. The apparatus of claim 18, wherein the processor is further configured to determine a slope angle of a wall of the at least one trench by determining the angle of incidence at which the intensity of the reflected light measured by the light detector begins to be substantially constant after passing through a critical angle A as the angle of incidence decreases.

22. The apparatus of claim 1, further comprising a display unit coupled to the operating unit.

23. The apparatus of claim 1, further configured to measure a parameter of multiple trenches.

24. The apparatus of claim 1, further comprising a test sample carrying unit configured to hold an object comprising at least one trench.

25. The apparatus of claim 24, further comprising:
   an operating unit coupled to the light detector; and
   a controller coupled to the operating unit and the test sample carrying unit and configured to control the test sample in accordance with a signal received from the operating unit.

26. A method for measuring a parameter of a trench with a bottom surface, comprising:
   projecting light into the trench at a plurality of angles of incidence; and
   measuring the intensity of light reflected from the bottom surface of the trench at each angle of incidence.

27. The method of claim 26, wherein the parameter comprises a depth of the trench.

28. The method of claim 26, wherein the parameter comprises an angle of slope of a wall of the trench.

29. The method of claim 26, further comprising determining a depth of the at least one trench by measuring a critical angle A, wherein the critical angle A is the angle of incidence at which the intensity of the reflected light measured by the light detector begins to become stronger as the angle of incidence decreases.

30. The method of claim 29, further comprising determining the depth of the at least one trench based upon the relationship $D=CD/2 \tan A$, where D is the depth of the at least one trench, CD is a width of the at least one trench, and A is the critical angle.

31. The method of claim 26, further comprising determining a slope angle of a wall of the at least one trench by determining the angle of incidence at which the intensity of the reflected light measured by the light detector begins to be substantially constant after passing through a critical angle A as the angle of incidence decreases.

* * * * *